June 13, 1961  G. C. DEVOL, JR  2,988,237
PROGRAMMED ARTICLE TRANSFER
Filed Dec. 10, 1954  3 Sheets-Sheet 1

INVENTOR.
GEORGE C. DEVOL, JR.
BY
Paul S Martin
ATTORNEY

June 13, 1961
G. C. DEVOL, JR
2,988,237
PROGRAMMED ARTICLE TRANSFER
Filed Dec. 10, 1954
3 Sheets-Sheet 2
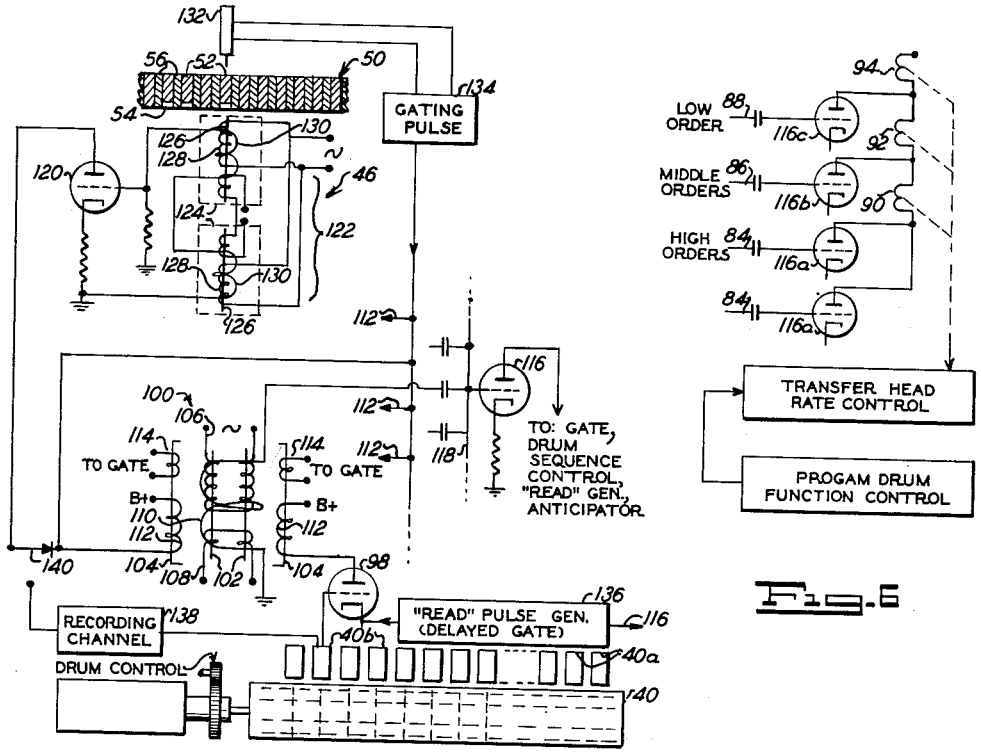
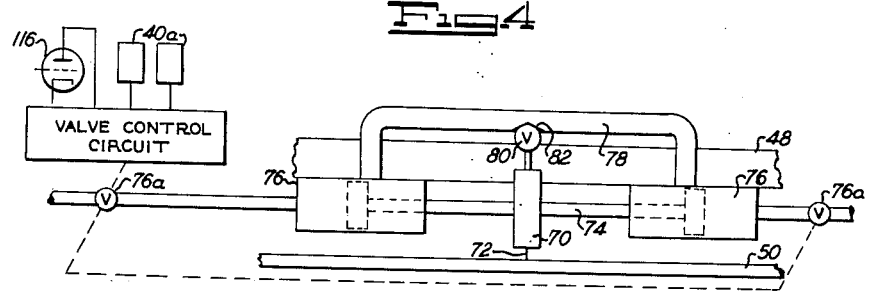
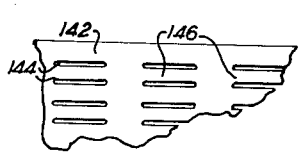
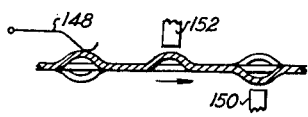
INVENTOR.
GEORGE C. DEVOL, JR.
BY
Paul S Martin
ATTORNEY June 13, 1961     G. C. DEVOL, JR     2,988,237
PROGRAMMED ARTICLE TRANSFER Filed Dec. 10, 1954     3 Sheets-Sheet 3

INVENTOR.
GEORGE C. DEVOL, JR.
BY
Paul S. Martin
ATTORNEY

United States Patent Office 2,988,237
Patented June 13, 1961

2,988,237
PROGRAMMED ARTICLE TRANSFER
George C. Devol, Jr., Brookside Drive, Greenwich, Conn.
Filed Dec. 10, 1954, Ser. No. 474,574
28 Claims. (Cl. 214—11)

The present invention relates to the automatic operation of machinery, particularly to automatically operable materials handling apparatus, and to automatic control apparatus suitable for such machinery. The invention will also be seen to have certain related method aspects. In view of the main objective, the following disclosure is addressed particularly to the handling of materials. However, certain of the novel features disclosed will be recognized as having more general application.

A broad object of the present invention resides in the provision of article transfer apparatus having versatile program control means.

From the earliest years in the mechanical handling of articles there have been but two types of machine control: cam control and manual control. Article handling by manually controlled hydraulic or electric or otherwise powered machines is found for example in cranes for the transport of heavy objects from a first location in a factory to other locations. Instances of cam control are common, as in the transfer of articles from one unit in a system of conveyors to another conveyor unit.

Manually controlled article handling equipment, as well as article transfer by the unaided workman, have the highly desirable property of being most flexible, being instantly adaptable to each new set of operating requirements; but such manually controlled equipment or actual manual handling entails the high cost of operating manpower. It is exceedingly wasteful of precious manpower, avoidable under the invention where the operation is of a type that is any way repetitious.

Cam control of repetitious operations is quite common in specialized applications; but each application involves such high cost and it involves such specialization that only large-volume specific tasks are mechanized through cam control.

The present invention makes available for the first time a more or less general purpose machine that has universal application to a vast diversity of applications where cyclic control is to be desired; and in this aspect, the invention accomplishes many important results. It eliminates the high cost of specially designed cam controlled machines; it makes an automatically operating machine available where previously it may not have been economical to make such a machine with cam-controlled, specially designed parts; it makes possible the volume manufacture of universal automatic machines that are readily adaptable to a wide range of diversified applications; it makes possible the quick change-over of a machine adapted to any particular assignment so that it will perform new assignments, as required from time to time. It can be seen that cyclically operated machines heretofore controlled manually can now be made automatic; and universal transfer machines can be supplied and adapted readily for special applications of the purchaser, and the purchaser, in turn, can stock such machines which he can adapt quickly and easily to new requirements from time to time.

In applying the invention, program techniques known in certain other arts are applied for the first time to article transfer machines and adapted to meet special requirements of such machines. Programming techniques have long been known, as in weaving and knitting machines, as an example, and in automatic machine tools. In spite of this, the routine job of transporting one article after another from a supply point to a delivery point has not heretofore been met with flexible programming. The art of article transfer machines has been identified persistently over the years with motions produced by operating cams or, more recently, by limit switches that can accomplish certain few operations, yet nothing short of manual control or direct hand transfer has been devised to serve where real versatility is required.

Universal automation, or "Unimation," is a term that may well characterize the general object of the invention. It makes article transfer machines available to the factory and warehouse for aiding the human operator in a way that can be compared with business machines as an aid to the office.

In applying one feature of this invention, for making a universal, automatic article transfer machine, the article transfer head (whether it takes the form of jaws, a suction gripper or other comparable article-handling tool) is moved by a mechanical power source through a sequence of strokes whose lengths and directions are determined by a program controller. Where several different motions are involved, as lifting and swinging and twisting, each independent motion is ordinarily controlled by its own track of an organized program control. Usually seizing and releasing operations of the transfer head require no more than a simple on-off control. But whether controlled for proportional closing or for close-and-open operation, this, too, is coordinated with the transfer-operation controls in the program controller.

An especially desirable form of program controller combined with the transfer mechanism to be controlled represents a further feature of the invention. According to this concept, the transfer mechanism operates the transfer head (or a sub-carrier of a mechanism that directly carries the transfer head) and at the same time it displaces a position detector or position representing device; and the position detector is compared through a feedback loop with the program controller, until the position detector of the transfer head is displaced into coincidence or matching. Various forms of position detectors, program controllers and comparison detectors may be used in accomplishing the more general objects of article transferring. Positive and precise orientation may be achieved in accordance with a further aspect of this invention, by adopting a code representation for each significant, discrete position of the transfer head. In this system, coded recordings on the program controller are compared with coded elements in the position detector. Coded elements become effective in sequence when the transfer head is moved, and the head may stop or continue moving at an angle to the previous path when coincidence of the codes is detected in the program controller and the position representing means. As a specific feature of the invention, this position representing means advantageously comprises a sensing element cooperating with a stack or row of unique long and thin combinational code elements, wherein each element extends across the row, and each combinational code element is sensed by as many sensing elements as there are bits in the combinational code. The combinational code elements are sensed in succession as the transfer head travels.

The code could be entirely arbitrary; but there is special advantage where each combinational code represents the numerical value of its rank in the sequence. Thus, a different member may be assigned to each $\frac{1}{16}$ inch displacement of the transfer head; and the first $\frac{1}{16}$ position may be represented by the code for "1"; the second $\frac{1}{16}$ may be represented by the code for "2"; and as many many coded elements will be used as there are $\frac{1}{16}$ inches in the range of motion of the transfer head. This $\frac{1}{16}$ inch dimension is naturally only an example of a significant increment. Much smaller values are quite practical where warranted. The sequence of position codes that the transfer head is to assume are recorded on the program controller in accordance with the positions that the transfer head is to assume in its operating cycle. These recorded codes are compared with the codes detected by the position sensing elements that move with the transfer head, motion of the head continuing in the required direction until coincidence is achieved between the program code and the position representing code. The program controller may arrest the transfer head at coincidence, or it may dictate advance to a next position, all in accordance with the operations recorded on the program controller.

Article transfer mechanism involves some special considerations not necessarily significant in other program controlled apparatus. One special consideration is the high speed of traverse of the transfer head usually needed. A detailed but important feature of the invention resides in direct drive of the position representing devices co-ordinately with the transfer head, free of extended gear trains that would inhibit such fast traverse.

A further feature of the invention resides in promoting fast traverse of the transfer head to the stop position next required by the program controller. Fast traverse is best achieved by providing for speed reduction in advance of the required stopping point. When appropriate programmed rate-control is provided in the controller, the fast traverse rate is easily reduced when the transfer head reaches a first programmed position so that it can be arrested from the reduced travel rate at a later coded position. Overtravel of the transfer head is likely to be disastrous in some transfer applications and instantaneous stop of the transfer head upon detection of coincidence between the program controller and the position detector would ordinarily require extremely slow traverse speed. However, high traverse rates may be used followed by slowed traverse by incorporating a rate-controlling anticipator in the position detector. Also the same broad result may be achieved by comparing the values of the numbers represented by the position detector and the program controller. In both instances, as coincidence is approached, the rate of traverse can be reduced under control of the anticipation means. This allows slow traverse near the final coincidence position of the article transfer head. Finally, an accurate stop at coincidence is effected after slow travel of the transfer head, with no overtravel.

Positional correspondence between the program controller and the position detector of the transfer head is relied on to stop the head at any desired series of positions. The program controller may also have a rate code associated with each head-position code, for controlling the traverse rate. At the expense of an increased number of coded instructions on the program, the transfer head can be moved fast to one position and then at lower rate as controlled by the program controller to the stop position; and proportional retarding is also feasible with appropriate rate controls, without reliance on an anticipation arrangement in the position-representing means. Multiple motions may occur concurrently, such as sweeping a transfer head about a vertical axis, while first lifting and then lowering the head during the sweep; and radial motion may be added under control by the program controller, controlled both as to positions and as to rates. Compound, complex sequences of motions are definitely contemplated, wherein each motion is coordinated with the others, to yield any arbitrary path of motion.

In a very flexible embodiment of the invention, the transfer-head program codes can be recorded in the very machine that later is to be controlled automatically, and such a system is a further important feature of the invention. In this type of operation, the machine is cycled slowly with the position representing means operating to proved coded control combinations then entered into the program controller, this recording being advantageously in the form of magnetized areas. The recorded codes are all in accordance with the sequence of positions later to be assumed by the transfer head, and rate control codes are also recorded either during a test operation of the machine or arbitrarily under manual control, as with a keyboard-controlled recorder. In this kind of operation, the magnetic form of program controller is regarded most suitable as being readily erased for re-recording and correcting recorded control codes, and as having great capacity for many programmed instructions. Additionally special information can be recorded in each use of the apparatus for special selective operations.

Further objects and features of the invention reside in novel position representing elements and methods of fabricating them; in a servo system incorporating novel position encoders and decoders of novel form; in novel coincidence detection devices of simple but highly effective design useful in comparing the position detection code and the program controller code; and other novel features that will be apparent from the following detailed disclosure.

The accompanying drawings represent illustrative embodiments of various features of the invention. In the drawings:

FIG. 4 is a diagram of the control apparatus of the embodiment in FIGS. 1 and 2.

FIG. 5 is a side view of an anticipator useful as part of the embodiment of FIGS. 1–4, and FIG. 6 is a modified form of anticipator.

FIGS. 7 and 8 are enlarged fragmentary cross-section and plan views of a modified form of program recording and controlling apparatus useful in the apparatus of FIGS. 1, 2 and 4.

Figure 1:
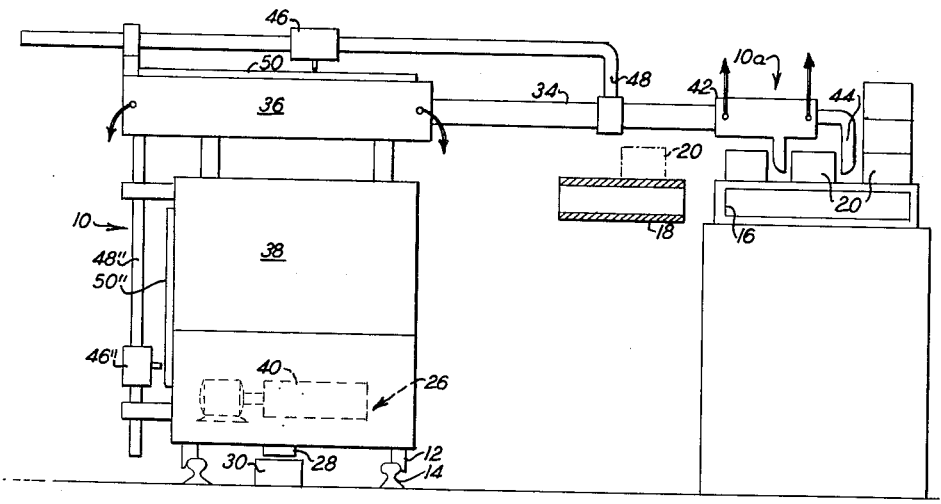
FIG. 1 is a somewhat diagrammatic elevation, partly in section, of article transfer apparatus embodying features of the invention.
Figure 2:
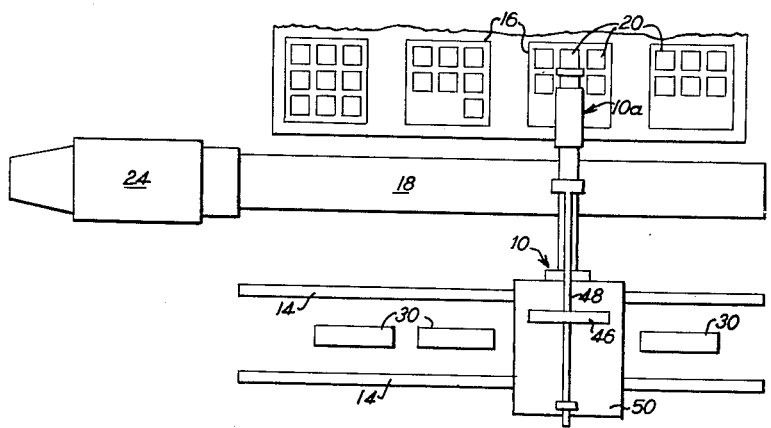
FIG. 2 is a plan view of the apparatus of FIG. 1.

In FIGS. 1 and 2, transfer apparatus generally designated 10 is movable on wheels 12 along tracks 14 to travel the length of a line of pallets 16 and a conveyor belt 18. The pallets support cartons 20 in regular patterned arrangement, which cartons are to be loaded selectively on conveyor 18 by apparatus 10 for transport to a delivery point represented by truck 24.

The pallets may support warehouse inventory of articles, and the transfer apparatus then effects selective automatic delivery of an ordered list of the articles along a conveyor to a shipping point where the truck is loaded. This operation commonly is accomplished by manual labor, a waste of manpower that is here corrected. The form of apparatus shown is chosen to illustrate certain concepts, and obviously does not represent the ultimate in complexity or flexibility, nor does this embodiment require the high order of precision that can be achieved with the invention.

The transfer apparatus contains a programming control in which are stored the memory of each of the motions required to remove each article from each pallet, and a memory of which article is next to be removed after others previously were removed. Additionally, the apparatus includes control tracks directing selection of a sequence of pallets and directing the number of article-transferring cycles the apparatus must function to deliver the right number of articles from the pallets selected. The number of articles to be removed from the selected pallets is controlled by selective data that is freshly entered into the program control at the start of an automatic order-filling sequence of operations. After each item has been removed by the apparatus in following a selected cyclic article-transfer operation, the selective control data is "consulted" by the apparatus to initiate the next article removal sequence of motions, as needed to fill a shipment. The selective data can be replaced by keyboard control of pallet selection, in using somewhat less than the full potential of the "unimatic" transfer apparatus.

The pallet selection control directs the transfer apparatus to the right location; the program drum then controls transfer of an article to the conveyor with program-controlled motion; and the completion of each program-controlled article transfer operation initiates the next selected article-transfer operation.

In FIG. 1, the transfer-apparatus control unit 26 includes sensing device 28 which when aligned with magnetic-material code pattern 30, locates the transfer head 10a opposite the right pallet, details of which are omitted as being unnecessary to an understanding of the invention presently claimed. The program drum next selects the right height and the right row (back-to-front) for removal of the next article in the sequence, the program drum acting to commence operation at that phase of its complete unloading sequence which was interrupted when an article was previously unloaded from that pallet.

A unique code pattern 30 will correspond to the code pattern of the pallet selection control and should correspond to the respective code patterns of the items on the pallets, where both the pallets and the articles have codes. The description of the control apparatus for directing unit 10 to a particular location along track 14 and for comparing the codes 30 with the codes on the items stored on the pallets is brief since it is not claimed specifically herein. It shows one way that the unit 10 can be utilized as part of an automatically controlled system.

As the dispatcher sets up each new code, unit 26 controls the drive of transfer apparatus 10 along track 14. Conveniently, the travel may be in a predetermined direction, to reach the end of the track and reverse if necessary, in searching for the code 30 demanded by the dispatcher. When correspondence is achieved, the transfer head 10a is aligned with the right pallet 16, in readiness to transfer one or more of the units 20 to conveyor 18. During the transfer operation head 10a brings its magnetic sensing elements against the magnetic-material code areas of the article 20 being transferred, for code-comparison and verification. Where the magnetic areas are in the form of stripes extending parallel to track 14, the need for a critical registration of the pallet-selection sensing devices and the code areas along the track is avoided. It should be understood that in broad concept, sensing head 28 may be disposed to cooperate directly with the code areas of the items 20, thereby eliminating the separate verification process.

Attention may now be given to the nature of transfer apparatus 10. This apparatus includes suitable drive means for operating head 10a to transport items from the pallets to the conveyor, for lowering the head onto one of the articles 20, and for taking hold of the article and transferring it to the conveyor in readiness for the next automatically selected article-transfer operation. Apparatus 10 includes an arm 34 that telescopes into hydraulic actuator 36 for moving head 10a horizontally, and this arm and its actuator are reciprocable vertically on the elevator 38 to raise and lower head 10a. These rectilinear motions are manifestly illustrative, for others are naturally within present contemplation. It is clear that swiveling motions may prove useful in addition to or in substitution for the motions shown. For example, conveyor 18 may be positioned on the side of track 14 opposite pallets 16 simply by building elevator 38 on a base having a suitably controlled swivel drive.

Elevator 38, hydraulic actuator 36 and head 10a are controlled in a way to achieve an important object of this invention, under program control. Unit 26 includes a program drum 40 and appropriate translating circuit devices (discussed in further detail below) to drive head 10a into extended position above a box 20, lower the transfer head on the box, grip the box, and then lift it, shift it, and deposit it on conveyor 18. The horizontal stroke of head 10a will be different for each succeeding box removed from pallet 10. Also, the vertical stroke produced by elevator 38 will be different where different levels of a stack or articles are to be removed. The program drum will contain control indicia for the whole sequence of motions involved in transferring the whole supply of the articles from the pallet. The motions will be repeated each time the supply of boxes is exhausted and renewed; and in the event of partial depletion and replenished supply, the starting point in the program sequence may be adjusted accordingly.

Head 10a includes a hydraulic actuator 42 for jaw 44, controlled by the program drum 40 for simple open-and-close operation; or it may be fitted for adjusted ranges of operation to accommodate different sizes of articles on the different pallets. In the latter event it can effectively be provided with the form of stroke control found on arm actuator 36 and elevator 38, to be described in detail.

Hydraulic actuator 36 operates arm 34 to the extent needed in effecting the transfer strokes of head 10a. A sensing head 46 is connected by arm 48 to move coordinately with head 10a, and in this way sensing head 46 moves along position encoder 50. This device consists of a series of combinational code elements (FIG. 3) arranged in the order of their numerical rank, and the space occupied by each code element is equal to the unit-distance traveled by head 10a in carrying the sensing head 46 from one code element to the next. The codes picked up from the encoder are compared with the code picked off program drum 40. Arm 48" that is connected to move mechanically in the vertical direction with transfer head 10a carries sensing head 46" along position encoder 50" to control vertical actuator 38 in exactly the same way that the parts bearing the corresponding numerals operate horizontally. Each motion is controlled by a sequence of related position codes in sequentially used "slots" on the program drum, to be described in detail.

The sensing head and the transfer head are directly connected to move as a unit, an important feature of the invention where relatively high speed of traverse and precise positioning are required. This has an advantage over geared connections where looseness and retarded motions enter the picture. These factors rise to serious proportions as the ratio of relative motions of the traverse head and the sensing head increases. In certain applications of broader aspects of the invention, the foregoing effects of gearing may be of little concern. For example, it may be acceptable in certain applications to include position code elements at a geared-up part of the drive mechanism for the transfer head. However, such arrangement might well be unworkable where the same system is to be operated in reverse. In one important aspect of the invention to be described more fully, reverse operation may be quite important. Instead of having the drive means operate the transfer head 10a together with the position representing means 46, 50, as is the case when cycling the machine under program control, the transfer head may be manually moved into the sequence of positions required, and, with the head, the position representing means may be adjusted, to provide combinational codes representing the positions of the head for recording in the program controller. If there were a drive of great gear ratio coupling the position representing means to the transfer head, the foregoing form of operation might be prevented. While there usually are ways to avoid this difficulty, still there is a clear value to a direct mechanical connection between the programmed transfer head and the position representing means.

Figure 3:
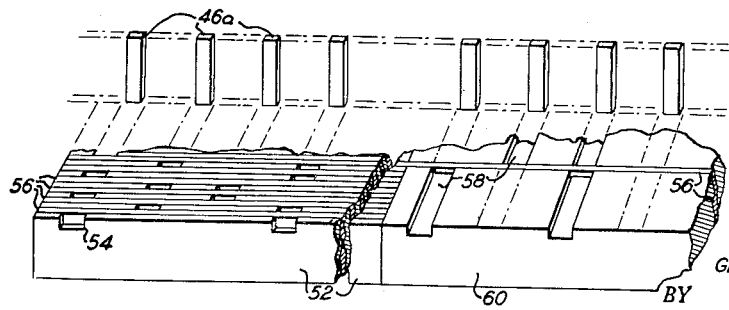
FIG. 3 is an enlarged fragmentary diagram in perspective of a portion of the apparatus in FIGS. 1 and 2.

The form of position-representing means 46, 50 that is presently preferred involves a detector sensitive to magnetic material at each of the series of code positions in the sensing line, cooperating with the thin strips of ferromagnetic material that are edge-notched with the unique codes that represent the various positions along unit 50. This is illustrated in FIG. 3, where edge-notched iron code bars 52 are stacked so as to be distributed at locations precisely represented by the code they bear. Each strip 52 has a combinational code of edge notches 54, and each strip occupies an assigned space in the direction perpendicular to the plane of the strip. This strip material can readily be obtained in precise thicknesses that are controlled at relatively low cost, produced by rolling. The assemblies 50 can be economically made, pursuant to a detailed feature of the invention, by sending strip stock through an appropriately selective edge notching punch, automatically sequence-controlled to notch the material in the sequence of codes they are to have in the stack, and to cut and stack the notched strips in the sequence as they are made.

A stack of unique edge-notched strips each of which occupies virtually the same space along the stack as shown in FIG. 3 has associated therewith a series of sensing elements represented by cores 46a, each preferably thinner than the code strips. These sense the difference between the absence of ferrous material, as represented by a notch, and the unnotched strip. This sensing, effective both during motion and at rest, is effected under principles in my above-mentioned patent.

As the sensing elements travel across the strips, they would be affected by pairs of strips as they pass from each strip to the next. This effect is greatly reduced by using non-ferrous spacers 56 betwen the coded ferrous strips, each ferrous strip and one spacer occupying the distance represented by the code bar itself. The unit space represented by a code strip is in a sense occupied by that strip. The spacers separate the coded bars so that the sensing cores fully depart from each code strip before reaching the next. The spacers also function (in cooperation with detector 132 and gating pulse generator 134, FIG. 4) in providing blanking or gating pulses that suppress output from the sensing elements except when nearly centered opposite a code strip.

When a large number of the foregoing strips are piled one on the others to add to a great thickness, it will be noted that no change occurs in coding throughout a large sequence of the code strips. Long channels 58 are formed by the code notches. Rather than to form these portions of the code block 50 using portions of strips 52, these channels may be formed of solid metal stock, in unit 60. Where changes occur, non-ferrous spacers 56 are still of advantage.

Before discussing the circuits of FIG. 4 that integrate the apparatus of FIGS. 1–3, it would be well to note the anticipation devices of FIGS. 5 and 6.

FIG. 5 is a side view of an "anticipator" mechanism. The purpose of this device is to make possible the anticipation of coincidence or matching of the position code set up by the program controller 40 with the position representation in the position encoder 46, 50. It is desirable to detect approaching coincidence in advance for many reasons, one of which is to control the drve of the head 10a for deceleration so that when ultimately there is true match, the transfer head will stop in exact register and thus avoid troublesome overtravel. The main stroke of the elevator 38 and of the actuator 34, 36 each transports the head 10a rapidly, with the provision of automatic deceleration as the endpoint of any stroke approaches. Of course, where a complex sustained motion is programmed, the position codes may not represent stopping points. Therefore the anticipator is controlled by the program drum (as will appear) to be inactive during coincidence searching for intermediate coded coordinates of a complex stroke.

A form of anticipator is shown in FIG. 5. If used, this is to be included in the apparatus of FIG. 1, mounted on arm 48 to take the place of sensing head 46. Sensing head 70 includes a row of sensing elements with their respective fine cores 72 arranged as are elements 46a, FIG. 3. The circuit connections and internal form of each sensing element in head 70 are the same as those for each element 46 (FIG. 4). The sensing elements forming head 70 are carried as a unit on movable shaft 74. This shaft is part of a pair of hydraulic actuators 76, 76 linked together by a guide bar 78. A spring detent 80 is pressed against bar 78 during operation of units 76; and detent 80 (as shown) centers itself in V-notch 82 when approximately centered and released by suitable control over units 76.

Control of the actuators 76 is by valves 76a under control of function selection circuits 76b controlled by sensing elements 40a and function control tracks on the program drum. Head 70 is projected forward of its centered position shown, that is, ahead of the centered position to the extent of the limited stroke of actuators 76 in either direction of travel (left or right in the drawing as controlled by the "direction" function control tracks on the program drum). When coincidence is first detected, the actuators 76 are appropriately controlled by control circuit 76b under control of the coincidence detector output tube 116 described below to return sensing head 70 to the centered condition, to search for the second, true-positioning match or coincidence. The stroke of the transfer head 10a proceeds much slower after first, anticipating coincidence detection, so that stopping the stroke at true match is effected with a minimum of shock or impact, and overtravel can be prevented.

An alternative of the anticipator of FIG. 5 involves the use of an arithmetic series of code strips 52 (FIG. 3) in unit 50, driving the sensing head (and the article-gripper with it) at top speed at first, the speed diminishing as high decimal orders or high scale-of-two orders are first matched, and with further reduced speed as the lower orders are matched, stopping ultimately when coincidence is reached. This is illustrated in FIG. 6, where input orders 84 are high, order 86 is middle and 88 is low. If any high order is mismatched then the first step of check-valve closing for rate-reduction of hydraulic actuator 36 (FIG. 1) will be disabled and the rate will be a maximum. If both high orders 84 of the coincidence detector are matched, the rate controlled by unit 90 will be reduced. It will be reduced still further by rate control unit 92 when middle order (or orders) 86 are matched; and upon match of all orders in the coded numerical representation of a stop position with the program drum code, the unit 90 will arrest the actuator 36. This rate reduction is naturally contingent on the function required by the program drum when the transfer head reaches the coded position. It may be unnecessary to stop the head, and an additional lateral stroke may be dictated by the drum in which case the rate controller will not be active. Arrangements involving proportional hydraulic valve and like continuous-variable controls are also contemplated, hydraulic, electrical, etc.

The general operations of the apparatus have been described in connection with FIGS. 1 and 2, and various forms of anticipators forming part of the controlled apparatus have been discussed. A form of control circuit for achieving the results described appears in FIG. 4.

Figure 9:
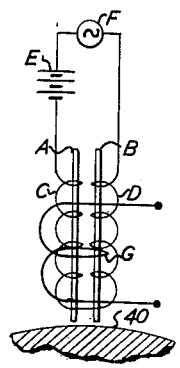
FIGS. 9 and 10 are wiring diagrams of two illustrative forms of magnetic detector that may be used where such detectors are required in FIGS. 4 and 11.

Drum 40 is shown as having a magnetic surface provided with axially arranged groups of magnetized and unmagnetized areas, or oppositely polarized magnetized areas can be effectively utilized. Such related axially-distributed areas may be termed a "slot." A group of code areas in each slot extending as a channel or track around the drum is assigned to each position-representing unit 46, 50 corresponding to each independently controllable motion, as back and forth along the track 14, horizontal toward and from the pallet, and vertical, in the apparatus of FIG. 1. Additionally, certain operation controls will be included by means of function control indicia on the drum, as in controlling operation of clamp 44, rate control for each motion, a direction control track, and control for an anticipation device. A step or drum-advance control track may be desirable in some circumstances. The various function sensing units are designated 40a in FIG. 4, the position-code sensing units being designated 40b. These are magnetic sensing elements capable of detecting the magnetized areas of the drum at rest and are effective also when the drum is in motion. Such sensing units capable of sensing at rest are disclosed, for example, in my Patent No. 2,590,091, and in my application Serial No. 161,702 (mentioned above) filed May 12, 1950 jointly with Erik B. Hansell, issued April 10, 1956 as Patent No. 2,741,757. An alternating-current excited magnetic detector of the type in the latter patent is shown in FIG. 9.

Such detector may include two cores A and B arranged and shaped so that at least one of them is exposed to the magnetic recording on the drum. These cores have coils C and D, respectively, wound on them and connected in series in mutually opposite sense, so that excitation from D.-C. bias source E makes the adjacent core ends oppositely polarized. The bias is adjusted so that each operates below saturation. Alternating current excitation from source F alternately adds to the bias flux and opposes it. A coil G is wound about both cores in the same sense. With balanced construction, no output appears at the terminals of coil G until core B is exposed to a magnetized recording. This magnetic field shifts that core into saturation at a time when core A is not saturated, and A.-C. output appears at the terminals of coil G despite the at-rest relationship of the core and the drum. The coil C may be considered as acting more effectively as a primary winding in relation to coil G as a secondary, than coil B, this latter acting as a poor transformer primary due to its saturated core when exposed to a magnetized spot on drum 40.

Any exposure of core A to the same magnetized field does not interfere with the detection process and may actually improve sensitivity, inasmuch as the field of the magnetized record opposes the bias in core A and therefore drives it further from saturation than when no external field is imposed. The assumed polarity of the bias in core B is such as to be aided (toward saturation) by the flux of the recording. The theory of magnetic detection by this form of detector is more fully expounded in said Patent No. 2,741,757.

Figure 10:
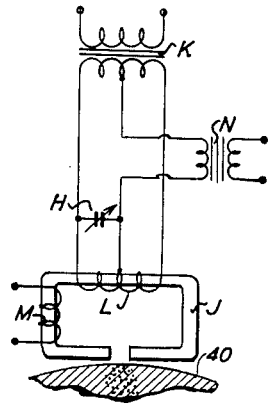

In FIG. 10, the detector of FIG. 2 in my Patent No. 2,590,091 is shown adapted to detection from the surface of the drum here involved. The C-shaped core J in FIG. 10 has its air gap opposite to the control area of drum 40 where there may or may not be a magnetized spot. Center-tapped transformer K supplies A.-C. drive to center-tapped winding L on core J. This is balanced at the excitation frequency by condenser H. D.-C. bias may be desirable, in which case coil M is used. The A.-C. drive in the absence of a magnetic field in the gap of core C will not produce output at transformer N that has its input winding between the centertaps of the two units K and L. A magnetic field from drum 40 will shift core C sufficiently into saturation, particularly during the A.-C. peaks, to cause second-harmonic output to appear at transformer N.

Various forms of detectors responsive to local magnetic fields can be used. It is desirable for the sensing units to include provision adapting them to magnetic recording. For example, in FIG. 9, coil G may be used for recording, and in FIG. 10, coil M may be so used, using current from recording channel 138 (FIG. 4), to be described. Naturally separate sensing and recording heads can be used.

The information represented in the areas sensed by units 40b is converted, with suitable amplification in tube 98 if needed, and applied to Amplet coincidence detector 100. This form of matching or coincidence detector is described in the application above identified and claimed in a continuing application thereof, filed jointly by Erik B. Hansell and me. Other known coincidence detectors can be substituted, such as those employing flip-flop storage devices and logical "and" circuits.

Amplet 100 includes a pair of high-permeability cores 102 and a pair of sub-permanent trigger cores 104. Each of the latter develops a polarized, stored magnetic field that influences a respective one of the cores 102. An alternating-current winding 106 is wound about the cores 102 individually, the halves of this winding being connected in mutual opposition. A bias winding 108 carries direct current constantly in this example, and biases cores 102 to the required operating point. A secondary winding 110 is shown as extending about cores 102 and over both portions of winding 106 to detect magnetic unbalance by providing an alternating current output. Each trigger 104 includes a respective input coil 112 and a reset coil 114.

It may be assumed that like pulses have been impressed on reset windings 114, and that the system of cores and coils are balanced. No output appears from coil 110.

If a pulse is impressed on one winding 112 of the polarity that tends to maintain the same polarization as that produced by the reset winding, the device remains balanced. Similarly, if both windings 112 have pulses (or sustained currents) impressed so as to reverse the polarity previously established by the reset coils, balance remains. No output appears at coil 110. This balance represents "coincidence" of signals even though they may occur at different times. Perhaps "matching" is a more appropriate term than "coincidence." Now, if either sub-permanent trigger 104 is magnetized in reverse to the stored polarity previously imposed by its reset winding, unbalance results which impresses an output on common output tube 116, there being a separate coincidence detector 100 for each channel of information on drum 40 connected to some common output point 118. A separate output point 118 is provided for each position track such as those controlling actuators 36, 38, etc. Where multiple motions are in effect at once, they will ordinarily reach "match" at different instants, but when they all reach "match" the way is cleared for the next function dictated by the program drum to be carried out.

It has been shown that a pulse from the drum via elements 40b, 98, 112 stores a code bit in one of the triggers 104. The other Amplet comparison control includes a trigger 104 and coil 112 that is magnetized and reversely magnetized at rapidly reversing times as dictated by the codes picked up by unit 46, 50 (FIG. 1). When all the Amplets of a channel evidence matching, with all the trigger pairs magnetized alike, output at point 118 disappears, and coincidence is achieved so that the next function required by the program drum detectors 40a can be executed. Completion of each function dictates advance to the next program-control code area for new instructions, either by switching or drum indexing.

It has been assumed that drum 40 is advanced stepwise, so that each slot is in constant condition to be read by devices 40a, 40b. However, the high-speed drum and information-selecting techniques well known in the electronic computer art is also contemplated as a substitute form of program recording and controlling system. Similarly the Amplet matching or coincidence detector described may be replaced by other forms of detectors, if desired. Notably the Amplet coincidence detector shown stores transitory input signals at the respective input triggers, and gives favorable response when the triggers are magnetized alike for both polarities of magnetization. This is more than is accomplished by the usual "and" logical network where only one sign of coincidence is distinguished from mismatch.

The left hand trigger winding of the Amplet coincidence detector 100 for each code bit is energized by a proper amplifying and converting device represented by the stage 120 that, with detector 122, derives position-code information from encoder strips 52, as described in connection with FIG. 3. Unit 122 is illustrated as of the alternating-current excited type in the aforementioned application and patent. A pair of direct-current bias coils 124 bias the cores 126 one of which is exposed to code strips 52 and the other of which is an isolated reference unit. Coils 128 on the respective cores produce alternating current or periodic pulsed excitation, and stage 120 derives unbalanced or balanced input from coils 130 on the respective cores, depending on whether a slot 54 or an unslotted strip 52 is disposed opposite the upper core 126 in the drawing.

Stage 120 can readily be designed to impress opposite polarities of magnetization on the trigger 112, 104, in order that the magnetization of the trigger shall represent the slotted or unslotted strips 52 that move past detector 46. However, the same result is achieved with a special arrangement shown, wherein an additional sensing head 132 operates a gating pulse generator 134 to energize coil 112 in the "reset" sense. This arrangement also gates stage 120 and thereby suppresses output thereof during the times that upper cores 126 pass spacers 56 between code strips 52. Stage 120 is then designed to develop the opposite magnetizing current or none at all, depending on the code bit to be represented.

When anticipation is used, of the form in FIG. 3, the first coincidence detection appearing from stage 116 is utilized to readjust the sensing head of FIG. 5. It will be understood that one of the elements 40a controlled the direction of travel of head 10a, according to recorded indicia on the drum, and another element 40a controlled adjustment of the anticipator in the advance travel direction under program record control, but only if the end position is one where the travel is to be interrupted. When the "advance" coincidence is satisfied, the system is switched, electronically, to seek the program-controlled function control that is to take place when the transfer head reaches its final or true coincidence position. That function control ordinarily is in the next slot, and is automatically ascertained by stepping the drum forward to that next slot. Suitable control circuits are included, so that during indexing of the drum, windings 114 of the Amplet coincidence detectors are cleared, and immediately thereafter, a delay "read" control 136 causes the codes from drum 40 to be entered and thus stored in the right-hand triggers 104 of FIG. 4 of all the coincidence detectors, one of which appears in the drawing. The delay suppresses entry of the drum codes into the Amplets 100 until the next drum slot is fully in effect.

The operations possible under drum control are by no means limited to the relatively simple back-and-forth sequence of strokes described in connection with FIG. 1. A motion may involve a temporary stop, and then there can be a continuation in the same direction, as where the transfer head carries an object from a supply point to an assembling position and then proceeds to a further position or positions before returning to the supply point. Contrasted with limit switching control, the described programming is manifestly far more versatile.

It has been noted that the use of a magnetic drum enables a vast amount of control data to be stored, and it also enables the apparatus to be operated in reverse for control data recording. Thus the apparatus may be cycled under manual control, and at each critical position the corresponding codes may be entered into drum 40 for subsequent automatic programmed operation. This is accomplished with the aid of a recording channel 138 selectively connected to magnetic devices 40b of appropriate construction by switch 140. Function control recording is similarly entered on drum 40 by recording coded control data via units 40a, as under keyboard control.

For example, let it be assumed that drum 40 is to have a recorded sequence for controlling removal of nine cartons in sequence from pallet 16. Transfer head is positioned over conveyor 18, at its maximum height, manually or with suitable manual controls for actuators 36 and 40. The position codes corresponding to this position may then be recorded on drum 40 by rendering channel 138 to become effective to do so. Drum 40 may then be indexed to dispose the next "slot" opposite the combined sensing and recording units 40a and 40b. The transfer head 10a is then moved horizontally to be over the carton first to be removed. The "travel-to-the-right" function control unit 40a is then activated to record that function control in that slot in the proper function track for such direction control, and all the position codes (as horizontal and vertical) are picked up by position encoders 46, 50, transmitted via channel 138, and recorded on drum 40 in respective tracks of that "slot."

Next, the drum is advanced one more "slot" and transfer head 10a is manually caused to descend in condition to seize the top carton. The "down" function control track is given a control recording in that slot of the drum, and the position encoders again are caused to record their coordinate position codes (via channel 138, etc.) in the same slot on the drum. The next slot on the drum is brought under units 40a and 40b by indexing the drum, and the function control track under that function control unit 40a identified with "gripper" hydraulic actuator 42 is given its corresponding control recording, again with concurrent recording of the various position codes.

The successive motions of transfer head 10a are manually effected, and at each point in the sequence of motions, the coordinate position codes are recorded in the respective tracks, successive slots of the drum 40 being used for these successive positions. In this way, the transfer head 10a is manually caused to move up (lifting the carton), then moved to the left over the conveyor, and down, and then the gripper is caused to open to deposit the carton, the position and function sequence being recorded at each control point. The same sequence is repeated for each carton of the stack and for each of the stacks.

Thereafter, each time a similarly loaded pellet is disposed opposite the transfer unit 10, it can be operated to remove the cartons in sequence. The drum 40 can be started and stopped for determining how many cartons will be removed at any time, the program drum remaining as a memory unit to start with the next available carton when more cartons are to be unloaded from the pallet.

It has been noted that combination code strips 52 (FIG. 3) are provided to represent the various positions of a whole range of operation. This code-strip assembly may be cylindrical rather than flat, especially where arcuate motion is to be effected. Also, the entire code for each position need not be represented on one strip, for at the expense of a single odometer connection, large range steps may be represented by block codes, and subdivisions may be represented on a combinational-code strip assembly that is repeatedly cycled or called into effect when the block or large-range coincidence has been matched. Care should be taken to maintain reversible drive of the encoder 46, 50 by the transfer head, by avoiding long gear trains in the connection, if certain special advantages of the invention are to be realized as discussed above.

Variation in details will naturally occur to those skilled in the art, and even novel changes by way of further improvement may be incorporated, within the spirit of the present invention. As an example, a storage medium capable of ready erasing and re-recording is illustrated in FIGS. 7 and 8 that simplifies the programming means, although it may reduce the storage capacity or increase its bulk for the same capacity.

In FIGS. 7 and 8, a flexible sheet 142 of metal, in the form of a strip or an endless belt, or a cylinder, has paired slots 144 and short bands 146 between the slots that are deformed so as to bulge out of the surface of the base material. The metal sheet is suitably supported for advance past a sensing position represented by a row of contacts 148 (a return electrical circuit being obtained at the support) for advance past a row of solenoid pusher rods 150 for selectively pushing certain bulging bands upward and selectively allowing other bands of the row to remain bulging downward; and past a pusher bar 152 that resets the set bulged bands so that they all project in the direction to be set selectively by individual pushers 150. Pushers 150 and 152 are on opposite sides of sheet 142. The number of bands 146 in each row across the sheet is made large enough to store the information bits needed for the control functions of the controlled machine, but multiple control sheets may be used to extend the control capacity if needed. The number of bulged bands along the strip is to accommodate the number of steps in the program.

Figure 11:
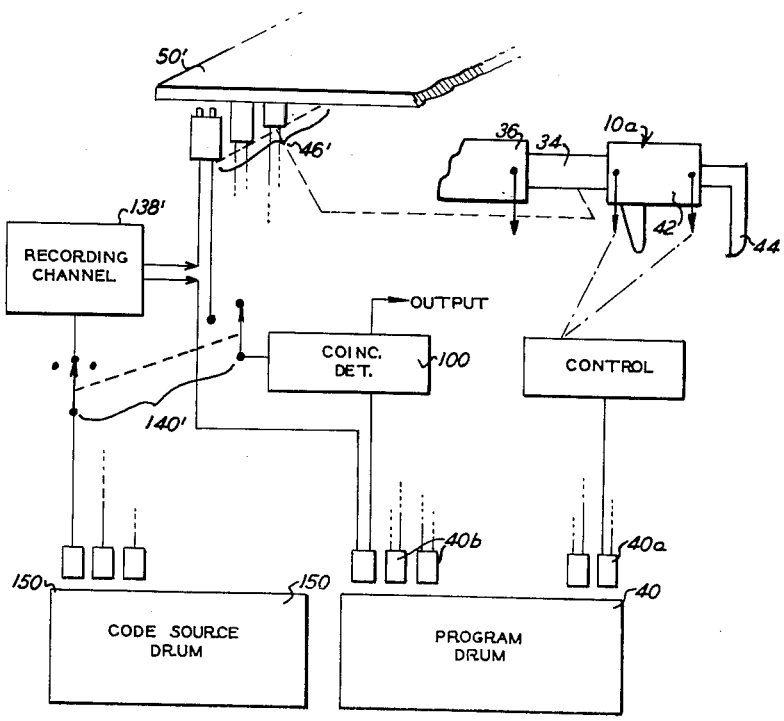
FIG. 11 is a diagram of a modification of FIG. 4.

A further modification of the system of FIGS. 1, 2 and 4 is an additional aspect of the invention. In accordance with this modification, a much simpler code can be used to accomplish basically the same operations as the previously described system, and the number of detector elements, and other parts which are equal in number to the number of bits in the code used, are correspondingly reduced in number without loss of function. In this modification (FIG. 11), a body 50' having a magnetizable surface replaces the form of element 50 described, and elements 46 are replaced by similar devices 46', such as those of the type in FIGS. 9 and 10, having the capacity of detecting magnetized spots and additionally having the capacity of recording such spots in other operating conditions. In addition, a source of arbitrary codes such as a drum having a large number of combinational codes is to be included.

In operation, the article transfer head 10a is moved to the sequence of positions that will later be required of it, and at each position the substitute magnetic element 46' is utilized as a recorder to register on the substitute position representing means 50' a code taken from the source of codes 150 via switch 140', a different code being used for every new position; and this code is concurrently recorded on drum 40 by the elements 40b. If 500 positions are of some special significance in the operation of the machine, as being stopping points or points at which deceleration is to commence, or signals for other functions to occur, then the code does not need to be more complicated than that required to represent 500. This represents a great reduction in the number of code detectors 40b and 46 (46') and a corresponding economy, but it does require elements 46 to have the capacity of recording, and it calls for a source of codes.

Operation of the modification described is not appreciably different from the operation of the system of FIGS. 1, 2 and 4, and need not be repeated. As an example of an operation, however, when the actuator 36 transports head 10a to a new location, coincidence detection results in stepping of drum 40 to the next information slot; and if this requires operation of article gripper 44, actuator 42 is operated under control of the pick-up 40a in the article-gripper track. A detail perhaps inadequately explained in connection with the description of the first system, which also applies to the modified system, is that a recording operation is effected by one of the elements 40a on drum 40 each time one of the articles on a given pallet 16 has been removed. When the next article is to be removed from that pallet, the article-transfer sequence of pattern or program-controlled operations commences with the next available article on the pallet.

It is apparent that further changes, and a latitude of applications and substitution will occur to those skilled in the art; and accordingly a broad construction should be accorded, consistent with the spirit and scope of the invention.

What is claimed is:

1. Apparatus having automatic control means, including a mechanical output device and power operating means therefor, position representing means coupled to said mechanical output device for conjoint operation therewith, said position representing means including an assembly of separate sensing units each having its own individual output and combinational code means sensed by and relatively movable with respect to said sensing units through a series of positions corresponding to positions of said device, said combinational code means including a uniquely identifying combination of control portions of different kinds opposite the respective sensing units in each said position such that the combination of control portions at each said position is different from the combinations of control portions in all the others of said series of positions, a program-controller having a series of recorded combinational code position symbols duplicating selected combinations in said series of positions, said program-controller having as many position-symbol sensing elements for sensing said combinational code position symbols as there are sensing units in said position representing means, a series of indidivual coincidence detectors each having its respective direct signal coupling to a corresponding one of said sensing units and to a corresponding one of said sensing elements, said power operating means having control means responsive to said coincidence detectors jointly.

2. Apparatus in accordance with claim 1 wherein said last-mentioned control means includes portions providing different control at different positions of said mechanical output device in its approach toward any particular selected position, and wherein said control means for said power operating means includes rate control means controlled by progressive approach of said individual coincidence detectors toward complete coincidence.

3. Apparatus in accordance with claim 1 including adjustable mechanical coupling means between said mechanical output device and said position representing means and a control connection from said series of coincidence detectors arranged to change the adjustment of said coupling means from an advance-sensing adjustment to a true-position sensing adjustment in response to detected coincidence.

4. Apparatus in accordance with claim 1 wherein said power operating means for said output device has rate-control adjustment means, and wherein said series of coincidence detectors has plural control connections to said rate-control adjustment means to effect progressive rate reduction as the number of such detectors that sense coincidence increases.

5. Apparatus in accordance with claim 1 wherein said program-controller is provided with a number of recording elements equal to said sensing elements, and including switching means for selectively coupling said sensing units to said recording elements, respectively, when operating said mechanical output device through a series of positions to be repeated later automatically, for recording a sequence of corresponding position symbols in said program controller, said switching means also being selectively operable for rendering said coincidence detectors effective for comparing signals of said sensing units with those of said sensing elements.

6. An article handling machine, including a transfer head, a program controller having storage means for position symbols, position-representing means coupled to said transfer head for conjoint operation therewith, said position-representing means including an assembly of separate sensing elements and a combinational code member opposite said sensing elements, said code member and said sensing elements being relatively movable so as to expose a series of positions along said code member to said sensing elements, said code member at each position including a combination of control portions of different kinds opposite different ones of said sensing elements, and the combination of control portions at each position being uniquely different from the combination of control portions at all other positions along said control member, and recording devices coupled to said sensing elements and operable to record a sequence of combinational responses of said sensing elements, respectively, in said program controller sequentially, corresponding to a sequence of selective positions of said transfer head, said transfer head additionally having an article gripper, control means for said article gripper, and means to record in said program controller control-representing symbols for said gripper control means.

7. Automatically programmed apparatus including a movable mechanical output device and power actuating means therefor, position representing means including a pattern portion and a sensing portion, one of said portions being coordinately coupled to said output device for corresponding movements therewith and the other of said portions being relatively fixed, said sensing portion having a series of sensing units, said pattern portion having a series of control pattern elements of two different kinds opposite said sensing units respectively in each represented position of said mechanical output device, and the combination of different kinds of control elements in each position being unique, combinational code control means producing a distinctive code output for each of a sequence of positions to be assumed by said mechanical output device including a series of control code elements having respective output means corresponding to said sensing units, and a series of coincidence detectors each having input coupling from a related one of said sensing units and from a related one of said control code elements, each said coincidence detector being of a form that is either balanced or unbalanced and responds in one way to matching control from its said sensing unit and its said control code element both when said sensing unit responds to one kind of control pattern element and when said sensing element responds to the other kind of said control pattern element, each said coincidence detector being unbalanced and responding to its said sensing unit and its said control code element differently than aforesaid in instances of mismatched input, said coincidence detectors having output control coupling means to said power actuating means.

8. An article handling machine, including an article transfer head, a program controller, power means for moving the article transfer head, position representing means operable coordinately with said transfer head, said position representing means including sensing means and control means having different identifying portions corresponding to the different positions that may be assumed by said transfer head, said sensing means and said control means being relatively movable for successive sensing of said control portions, drive means for operating said position representing means with said sensing means and said control means in an anticipation-sensing relationship, and means controlled by the response of the sensing means during anticipation-sensing for changing the relationship between said sensing means and said control means to true-position sensing relationship.

9. Automatic programmed apparatus, including a program-controller having a sequence of control slots sequentially in effect and having a series of parallel-output sensing elements in sensing relation to one slot at a time, each sensing element having either of two output conditions in dependence on the sensed control slot and said sensing elements collectively producing combinational output uniquely representing a destination instruction in each slot of the program-controller, a mechanical output device and power actuating means therefor, position representing means coupled to said mechanical output device to effect coordinate motions therewith, said position representing means including parallel-output sensing units each having either of two output conditions, a series of coincidence detectors individually having respective parallel-input coupling to one of said sensing elements and to one of said sensing units and each being of a form having one response to like input of either of two kinds both from the coupled sensing element and the coupled sensing unit and having a different response to unlike input from the coupled sensing element and the coupled sensing unit, and said coincidence detectors having output coupling means in control relation to said actuating means.

10. Automatic programmed apparatus in accordance with claim 9, wherein said program-controller includes a series of recording elements in recording relationship to one control slot at a time, and switching means selectively operable to couple said sensing units to said recording elements or to said coincidence detectors.

11. Automatic programmed apparatus in accordance with claim 9 including additionally a series of recording elements for a slot of said program-controller and a series of recording elements for said position representing means, a source of combinational codes, and switching means rendering one of said series of recording elements operative to record a sequence of codes from said source of codes in different positions of said position representing means to identify positions to which said mechanical output device is caused to move, and rendering the other of said series of recording elements operative to record the same sequence of codes in respective slots of said program-controller.

12. An article handling machine, including an article transfer head, a program-controller including means for storing a sequence of position representing symbols each including a series of bits of two types and read-out means for selecting one of said symbols including a number of sensing elements equal to the number of bits in a position representing symbol, power means for moving the transfer head, position representing means including a series of position-representing symbols each having a series of bits equal in number to the number of bits of said position representing symbols and including an equal number of sensing units, a mechanical connection between the transfer head and said sensing units, causing conjoint operation thereof, and means including a series of coincidence detectors each coupled to a respective one of said sensing units and each coupled to a respective one of said sensing elements and responsive thereto in one manner in case of match and in a different manner in case of mismatch, said last-named means being in control relation to said power means.

13. Article transfer apparatus including a selectively positionable article seizing device, combinational control means producing a distinctive code output for various positions to be assumed by said device, said control means comprising a magnetic program controller having storage means for a sequence of combinational codes and read-out means for selecting one of said codes, feed-back means for indicating correspondence between a selected code produced by said control means and the position of said selectively positionable device, said feed-back means including means operated by said device for producing a combinational code representing its position, code comparison means producing a distinctive response upon coincidence of the control code and the feed-back code, said program-controller including control means for operating said article seizing device in timed relation to the selective positioning thereof.

14. The method of transporting articles between a first place and a second place, one of said places having a predetermined article arrangement, including the steps of operating an article-transfer head between each different position of said arrangement of articles at said one place and the other place in sequence, recording control combinational codes representing each distinctive position of the transfer head in said sequence of operations, recording coordinated control indicia corresponding to the seizing and release operations of said article holder, and thereafter utilizing the control codes in controlling the operations of said transfer head and of the article holder thereon.

15. Apparatus for evidencing the position of a movable member both when at rest and when in motion, including a series of magnetically biased and alternating-current excited magnetic detectors, and a combinational code member having magnetically different portions opposite the detectors so as to present unique code patterns varying from point to point along the member in a direaction across the series of detectors, means moving the detecting means concurrently and coordinately with the movable member, and means indicating arrival of the member to such position.

16. Programmed apparatus, including a member movable in sequence to cycle to certain positions, a position representing means including a sensing portion having magnetic recording and detecting elements, and a portion bearing magnettic recordings in the form of combinational codes at previously determined positions, one of said portions being movable in relation to the other portion and movable concurrently and coordinately with said member, a program device having a succession of magnetically recorded combinational codes, coincidence detecting means for comparing the program code and the position representing code, and means for operating said member to the sequence of positions corresponding to the program codes.

17. Program apparatus in accordance with claim 16, including an article holder carried by said movable member, and program-controlled means for operating said holder to seize and release articles between program-controlled transfer strokes of said movable member.

18. Apparatus in accordance with claim 16, additionally including magnetic recording means adjacent said program device, and a source of different arbitrary codes arranged to be optionally operable for energizing said magnetic recording and detecting elements to record different codes on said magnetic-recording bearing portion of said portion representing means at different positions corresponding to positions in which said movable member is deliberately placed, said source of arbitrary codes also being arranged for concurrently energizing said magnetic recording means for concurrently recording said different codes successively in said program device.

19. Automatically controlled apparatus, including a mechanical output device, a master controller having read-out means for producing a selected position-representing symbol, power means for moving the mechanical output device, position-representing means coupled to said mechanical output device for movement therewith and including an adjustment effective for position-anticipating sensing and an adjustment for true position sensing, and means responsive to sensed anticipation to adjust the position representing means to true position sensing.

20. Apparatus in accordnace with claim 19, wherein said master controller includes means for storing a sequence of position representing symbols and read-out means for producing a selected position-representing symbol.

21. Apparatus in accordance with claim 19, wherein said mechanical output device supports an article gripper and wherein said master controller has means coordinated with said symbol producing means for separately producing gripper-control symbols.

22. Apparatus for evidencing the position of a movable member both when at rest and when in motion, including a series of magnetically biased and alternating-current excited magnetic detectors, and a combinational code member having magnetically different portions opposite the detectors so as to present unique code patterns varying from point to point along the member in a direction across the series of detectors, and means moving the detecting means concurrently and coordinately with the movable member.

23. Apparatus having automatic control means, including a mechanical output device, a program-controller having storage means for position symbols, position representing means coupled to said mechanical output device for conjoint operation therewith, said position representing means including an assembly of mutually independent sensing elements and a combinational code member opposite said sensing elements, said code member and said sensing elements being relatively movable so as to expose a series of positions along said code member to said sensing elements, said code member at each position including a combination of control portions of different kinds opposite different ones of said sensing elements and the combination of control portions at each position being uniquely different from the combination of control portions at all other positions along said control member, and recording devices coupled to said sensing elements and operable to record a sequence of combinational responses of said sensing elements, respectively, in said program controller sequentially, corresponding to a sequence of selected positions of said mechanical output device.

24. Transfer apparatus including a mechanical output element movable through a range of positions, a series of magnetically biased and alternating-current excited magnetic detectors having respective mutually independent output windings, a combinational code member opposite said detectors, said code member and said detectors being relatively movable through a series of sensing positions, so as to present different positions along said code member to said series of detectors for sensing, said code member including control portions opposite certain of said detectors that are magnetically different from control portions opposite others of said detectors in any given sensing position, and the combination of magnetically different control portions of said code member in any sensing position being uniquely different from the combination of control portions in the other sensing positions, means for relatively adjusting said detectors and said code member through said series of sensing positions, and a coupling between said adjusting means and said mechanical output element enforcing coordinate operation thereof.

25. Article transfer means, including an article carrier movable through a range of positions, a series of magnetically biased and alternating-current excited magnetic detectors, a combinational code member having magnetically different portions opposite the detectors so as to present unique code patterns varying from point to point along the member in a direction across the series of detectors, means for adjusting the detectors and the combinational code member in relation to each other, a coupling between said adjusting means and said article carrier for coordinate operation thereof, a magnetic storage program controller and means for recording thereon a series of position-representing combinational codes, read-out means for selecting said combinational codes individually and successively, and coincidence detection means for comparing the selected codes of the read-out means, respectively, with the output of said detectors for controlling the article carrier in accordance with previously recorded position-representing codes in the program controller.

26. Apparatus having automatic control means, including a mechanical output device, a program-controller having magnetic storage means for position symbols, position representing means coupled to said mechanical output device for conjoint operation therewith, said position representing means including an assembly of mutually independent periodically excited magnetic sensing elements and a combinational code member opposite said sensing elements, said code member and said sensing elements being relatively movable so as to expose a series of positions along said code member to said sensing elements, said code member at each position including a combination of control portions of different kinds having contrasting magnetic characteristics opposite different ones of said sensing elements and the combination of control portions at each position being uniquely different from the combination of control portions at all other positions along said control member, and magnetic recording devices coupled to said sensing elements and operable to record a sequence of combinational responses of said sensing elements, respectively, in said magnetic program controller sequentially, corresponding to a sequence of selected positions of said mechanical output device.

27. Automatic article transfer apparatus including an article transfer head having article seizing means, a carrier for said article transfer head movable in a predetermined stroke, a support for said carrier movable in a different stroke, a base movably supporting said support, respective power devices for actuating each of said article seizing means, said transfer-head carrier and said support, and program control means including a sequence of selective control indicia and sensing means therefor in control relation to each of said power devices respectively for automatically operating said article transfer head through selected portions of said strokes in a predetermined sequence of motions and for actuating said seizing means to seize and release articles in predetermined coordination with said sequence of motions.

28. Apparatus for evidencing the position of a movable mechanical output member movable through a range of positions, a magnetizable recording medium, a series of magnetic devices opposite said magnetizable medium, said devices including magnetic recording and magnetic-field sensing means, said medium and said magnetic devices being movable relative to each other, one of them being relatively fixed and the other being coupled to and movable coordinately with said movable mechanical output member, energizing means for causing said recording means to record control areas uniquely different at different locations along said magnetic recording medium, whereby the subsequent positioning of said mechanical output element at said locations will be uniquely evidenced by the output of said sensing means.

References Cited in the file of this patent

UNITED STATES PATENTS

| | | |
|---|---|---|
| 2,254,285 | Harris et al. | Sept. 2, 1941 |
| 2,284,803 | Crosman | June 2, 1942 |
| 2,398,067 | Winkler | Apr. 9, 1946 |
| 2,416,445 | Jensen | Feb. 25, 1947 |
| 2,438,848 | Eakins | Mar. 30, 1948 |
| 2,453,239 | Luhn | Nov. 9, 1948 |
| 2,537,427 | Seid et al. | Jan. 9, 1951 |
| 2,589,998 | Dougherty et al. | Mar. 18, 1952 |
| 2,590,091 | Devol | Mar. 25, 1952 |
| 2,628,539 | De Neergaard | Feb. 17, 1953 |
| 2,679,638 | Bensky et al. | May 25, 1954 |
| 2,694,804 | Wagner | Nov. 16, 1954 |
| 2,697,529 | Hubbell et al. | Dec. 21, 1954 |
| 2,710,934 | Senn | June 14, 1955 |
| 2,717,086 | Bush | Sept. 6, 1955 |
| 2,730,699 | Gratian | Jan. 10, 1956 |
| 2,785,353 | Fenemore | Mar. 12, 1957 |
| 2,866,506 | Hierath | Dec. 30, 1958 |

OTHER REFERENCES

Magnetic Sorting, "Electronics Magazine," pages 100–105, volume 25, number 9, dated September 1952.